Patented Nov. 12, 1935

2,021,044

UNITED STATES PATENT OFFICE 2,021,044

CASTOR OIL PREPARATION

John C. Bird, Philadelphia, Pa., assignor to John Wyeth & Brother, Incorporated, Philadelphia, Pa., a corporation of Delaware No Drawing. Application October 6, 1932,
Serial No. 636,582

6 Claims. (Cl. 167—56)

This invention relates to castor oil preparations and has for its primary object the preparation of an emulsion of castor oil in which the emulsifying agent shall be of a chemically inert nature, whereby such emulsifying agent is not absorbed by the system, but exerts adsorbent action upon the bacterial toxins of the intestinal tract.

A further object of this invention is the preparation of a product of this character which will eliminate the necessity for the use of added antiseptics in many cases, will give greater freedom from bacterial growth and eliminate the objectionable "soapy" flavor usual in many castor oil preparations.

The base for the preparation of castor oil made in accordance with the present invention is aluminum hydroxide gel. This gel is preferably prepared in the following manner:

16 lbs. of granular aluminum chloride c. p. is dissolved in 30 gallons of distilled water and filtered clear into a vessel of approximately 100 gallons capacity. 32 lbs. of ammonia 16° (10%) is diluted with 15 gallons of distilled water. With the solutions of aluminum chloride and ammonia at an approximate temperature of 35° centigrade the ammonia solution is poured into the aluminum chloride solution in a thin stream at a slow rate, constant stirring of the aluminum chloride being kept up during the pouring operation.

Aluminum hydroxide is thrown out as a gelatinous precipitate which breaks up under agitation. After the whole of the ammonia solution had been added to the aluminum chloride a slight excess of ammonia is added to the combined mixture, which is then allowed to settle. The supernatant liquid is then siphoned off and the resultant precipitate washed at least five times with distilled water, the precipitate being allowed to settle after each washing, the resultant supernatant wash liquid being siphoned off after each settling until the precipitated aluminum hydroxide is free of ammonium chloride.

The resultant aluminum hydroxide gel thus precipitated has the appearance of a smooth translucent cream, and possesses great superficial area of particle and high adsorptive power.

Using this aluminum hydroxide gel, the following is a typical formula of a castor oil emulsion prepared in accordance with this invention:

Aluminum hydroxide gel (3% solids) ___ 400 gms.
Castor oil _____ 700 gms.
Water _____ 50 gms.
Flavor and sweetening _____ q. s.

The quantities of water, gel and castor oil are placed together, flavoring matter and/or sweetening having been previously added to the castor oil.

The whole is then beaten together mechanically, forming a thick, creamy mass which is more or less stable according to the amount of mixing.

To prepare the completed product for internal administration, this cream is usually passed through a homogenizer or similar suitable emulsifying apparatus, the resultant product being a finely dispersed, stable and white emulsion containing approximately 60% castor oil combined with approximately 1% absolute aluminum hydroxide.

Various quantities of the castor oil may be emulsified with water, but in the example given amounts of from ½ to 2% of aluminum hydroxide gel may be used. It has been found however, that in using castor oil in excess of 60% of the total preparation, that it may be necessary to increase the amounts of aluminum hydroxide gel.

In practice it is found that in the presence of aluminum hydroxide gel larger doses of castor oil may be administered than would be possible without the gel. This fact is ascribed to a control of the laxative action of the castor oil by the lessening of peristalsis, caused by the astringent quality of the gel.

Various changes in the quantities of ingredients used may be made without departing from the spirit of this invention.

What I claim and desire to secure by United States Letters Patent is:

1. As a medicament for internal use, castor oil emulsified by aluminum hydroxide gel.

2. As a medicament for internal use a laxative compound comprising aluminum hydroxide gel, castor oil and water.

3. As a medicament for internal use, a laxative compound comprising aluminum hydroxide gel, castor oil, water and flavoring material.

4. As a medicament for internal use, castor oil emulsified by an emulsifier comprising a non-toxic astringent, inorganic gel having adsorbent action.

5. A medicament for internal use comprising, an emulsion of castor oil combined with an emulsifier and astringent agent comprising aluminum hydroxide gel.

6. A medicament for internal use comprising a water emulsion of castor oil combined with aluminum hydroxide gel as an emulsifying and a peristalsis modifying agent.

JOHN C. BIRD.